R. P. CUNNINGHAM.
Clock Escapement.
No. 18,890.
Patented Dec. 22, 1857.
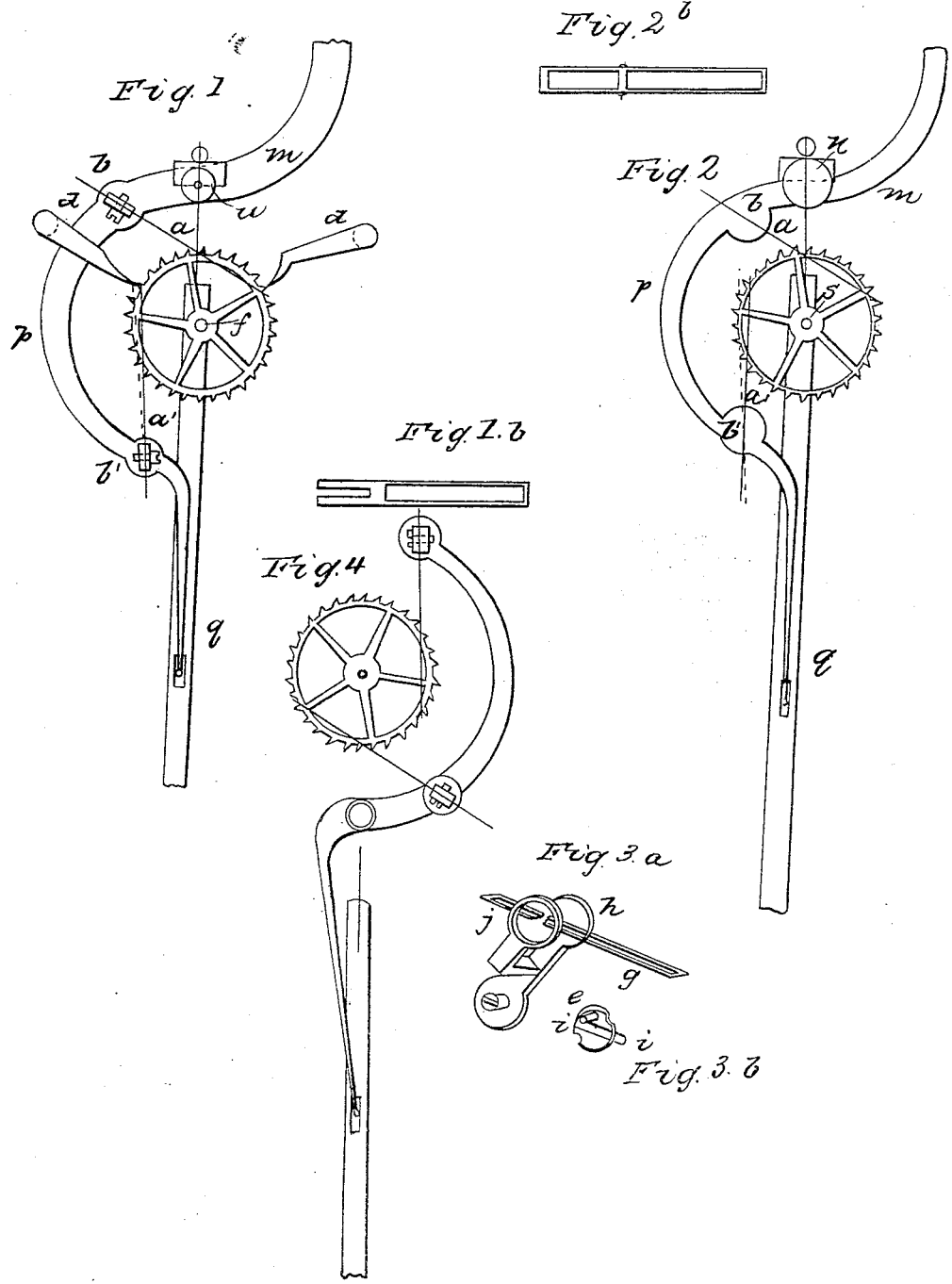

UNITED STATES PATENT OFFICE.

ROBERT P. CUNNINGHAM, OF EASTFORD, CONNECTICUT.

CLOCK.

Specification of Letters Patent No. 18,890, dated December 22, 1857.

*To all whom it may concern:*

Be it known that I, ROBERT P. CUNNINGHAM, of Eastford, in the county of Windham and State of Connecticut, have invented an Improved Escapement in Pendulum-Timekeepers, and the following is a full description of the construction and operation of the same, reference being had to the accompanying drawings, making part of the same, in which—

Figure 1, in sections, shows the spring pallets $a$ and $a'$, the swingwheel $s$, verge $n$, connected with the forkpiece $q$, and arm $b$, $p$, $b'$, and extension $m$, the dampers $d$ and $d'$. Fig. 1, $b$, shows the broad section of a pallet. Fig. 2, in sections, show pivoted pallets acting in the notch of the swingwheel $s$, as the spring pallets. Fig. 2, $b$, shows the broad section of a pivoted pallet. $k$, is a bridge spreading each way from the pivot arbor and connecting the two sides. Fig. 3, $a$ is a perspective view of a pivoted pallet $g$, with one pivot entered in a forkpiece, $h$. Fig. 3, $b$, formed as the cover to a watch spring barrel, carries a slender return spring stop $(i)$ projecting from a small stud $o$, standing inward from the cover as it is shut into the ring $j$, so the return part of the spring $i$, bears evenly and light on the bridge $k$, of the pallet, and thus is a guide to its middle or quiescent position, and this position is now adjusted by twisting the cover carrying the spring $i$, within the ring $j$. A jeweled or plain hole in the center of the cover receives the remaining pivot of the pallet. The forked piece, Fig. 3, $a$, screws to the verge forkpiece $p$, by the screw $v$, by which the length of pallet is adjusted to the work, as its rotary position is by a rotary twist of the cover Fig. 3, $b$.

In construction I provide a train to go in time of winding, and the frame in suitable ordinary manner. I place the verge spindle $n$, parallel to that of the swingwheel $s$, at an appropriate distance and direction from it, and vary them according to the required size, fashion, or use of the clock, or timepiece. I mount the pallet arm $p$, $b$, $m$, on the verge spindle $n$, so as to vibrate free of the swingwheel $s$, which I form of common thickness and very light, the teeth short with wide spaces, faced square from the direction of the pallets, or a little hooking on them, $a$, and $a'$, Figs. 1 and 2. I form the pallets on principles of the lightest construction, as looped springs or pivoted with loops to act in the notches of the swingwheel $s$, Figs. 1 and 2, so they act alternately, two of a kind, within the spaces of the swingwheel $s$ or $s'$; these pallets may be attenuated to an eighth, or less, than the size of the ordinary pendulum-spring. I prefer placing the pallets to act on the swingwheel at the points where radii from the verge touch its periphery, and thence extend them to cut equal proportional segments from the swingwheel and of a circle touching it and centered on the verge $n$. I fix the springpallets to studs $b$ and $b'$ by screws passed first through a jaw piece and tail space of the pallet. The studs are set to the verge arm $p$, $b$, $n$, by a cylindrical foot passed through and riveted, so as to form a stiff joint movable for setting the pallets in due direction, and the pallets are adjustable in length for action, by slipping them under a partial relief of those screws.

In action the springpallets thus are subject to tremulous motion on leaving the swingwheel, which in the use of a quickly vibrating pendulum does not sufficiently settle before they again contact with the wheel. To allay this tremor I form dampers $d$ and $d'$, on studs tapped into the frame, so the acting ends lying in the plane of the wheel range in a circle about the verge $n$, and within the ranges of the pallet loops, so as to reduce tremor and then remain free of the pallets in their courses as damped.

In operation these spring pallets alternately contact with the swingwheel $s$, in the notches, as do the pivoted pallets, described, and shown in the annexed drawings; and moving on by outthrow of the pendulum recoil the wheel, and thus relieve each other in a continuity of alternate action, an accumlating recoil being made by my following pallet $a$, Figs. 1, and 2, $a'$, tending to adjust the time lost by any outthrow in excess.

This escapement in being free of drop and of rubbing planes, can go without oil, has the least friction, carries a pendulum of the greatest momentum, and is of facile construction. Drop is subject to variation, greatly affecting the rate of time; this with the deranging effects of much friction, is here avoided; any equable motive force applied, is here most equably carried to its ultimate action, and maintains the most equable extent in the vibrations of the pendulum; by which, and the compensating action of the following pallet $a'$, an improved regularity of motion above that of other regulators is attained, so far as excellence is dependent on the escapement.

Claims:

1. Looped or slotted spring pallets acting tensively from the faces of the swingwheel teeth, $s$, Fig. 1.

2. I claim the combination of the tensive-pallets and swing-wheel-teeth; either with, or without the stops $d$, $d'$, (Fig. 1,) or with the stops $i$, $i'$, (Fig. 3, $b$,) for purposes herein shown, in manners as set forth, or substantially their equivalents.

ROBERT P. CUNNINGHAM.

Witnesses:
WHITMAN CHAMBERLIN,
MARIA A. CHAMBERLIN.